(12) United States Patent
Schwappach et al.

(10) Patent No.: US 8,156,617 B2
(45) Date of Patent: Apr. 17, 2012

(54) CARABINER WITH ANTI-CROSS LOADING FEATURE

(75) Inventors: Karl Schwappach, North Oaks, MN (US); Zine-Eddine Boutaghou, North Oaks, MN (US)

(73) Assignee: RDC Holdings, LLC, North Oaks, MN (US)

( * ) Notice: Subject to any disclaimer, the term of this patent is extended or adjusted under 35 U.S.C. 154(b) by 539 days.

(21) Appl. No.: 12/321,929

(22) Filed: Jan. 27, 2009

(65) Prior Publication Data

US 2010/0186202 A1    Jul. 29, 2010

(51) Int. Cl.
*F16B 45/02* (2006.01)
(52) U.S. Cl. ............. 24/599.9; 24/599.5; 24/600.1; 24/601.1
(58) Field of Classification Search .......... 24/599.1, 24/599.4, 599.5, 599.6, 599.9, 600.1, 601.1, 24/601.9; 294/82.19, 82.2
See application file for complete search history.

(56) References Cited

U.S. PATENT DOCUMENTS

| | | | | |
|---|---|---|---|---|
| 4,621,851 | A | * | 11/1986 | Bailey, Jr. ............. 294/82.2 |
| 5,005,266 | A | * | 4/1991 | Fister et al. ............. 24/601.5 |
| 5,384,943 | A | | 1/1995 | LeFebvre et al. |
| 5,416,955 | A | | 5/1995 | Katsma |
| 5,577,787 | A | * | 11/1996 | Klope ............. 294/82.19 |
| 5,664,304 | A | * | 9/1997 | Tambornino ............. 24/599.1 |
| 5,940,943 | A | | 8/1999 | Kloster |
| 6,622,354 | B1 | | 9/2003 | Klingier |
| 7,228,601 | B2 | | 6/2007 | Thompson |
| 2003/0167608 | A1 | | 9/2003 | Petzl et al. |
| 2007/0186393 | A1 | | 8/2007 | Thompson |
| 2008/0022497 | A1 | | 1/2008 | Thompson |
| 2011/0138587 | A1 | | 6/2011 | Walker et al. |

FOREIGN PATENT DOCUMENTS

| | | |
|---|---|---|
| EP | 1229258 | 8/2002 |
| FR | 2856309 A1 | 12/2004 |

OTHER PUBLICATIONS http://www.dmmclimbing.com—Belay Master 2009—Nov. 19, 2009.
http://www.edelrid.de—Galaxy—Oct. 13, 2009.
http://www.simond.com—Goliath HMS—Nov. 19, 2009.

* cited by examiner

*Primary Examiner* — Robert J Sandy
(74) *Attorney, Agent, or Firm* — Patterson Thuente; Christensen Pedersen, P.A.

(57) ABSTRACT

A carabiner with a generally C-shaped body includes a first end and a second end located on opposite sides of an opening. A primary gate is mounted to the second end. The primary gate is rotatable about a first axis perpendicular to a plane that bisects the C-shaped body. The primary gate is rotatable between a closed position with the primary gate engaged with the first end and the C-shaped body enclosing an interior region, and an open position with the primary gate located generally in the interior region. A secondary gate is attached to the primary gate and adapted to be displaced in the plane relative to the primary gate between a closed configuration that separates the interior region into a first portion and a second portion, and an open configuration that provides access to the interior region. The secondary gate can be displaced in the plane to extend across the interior region as the primary gate rotates between the open position and the closed position. Displacement of the secondary gate can include rotation and/or translation.

18 Claims, 10 Drawing Sheets

CARABINER WITH ANTI-CROSS LOADING FEATURE

FIELD OF THE INVENTION

The present application is directed to carabiners with anti-cross loading features that operate similar to a conventional locking carabiner.

BACKGROUND OF THE INVENTION

Carabiners are typically associated with outdoor recreational activities, such as rock climbing, mountaineering, and mountain rescue work. Carabiners are also employed in many other applications, such as rescue work in urban and industrial settings, safety restraints in urban and industrial settings, law enforcement work, and military applications.

A carabiner typically includes an incomplete loop of rigid material with a gate that completes the loop. The gate may be opened to insert a rope, sling, or a belay/rappel device. The gate is typically biased by a spring to the closed position. The gate may also be secured in a closed position by a locking mechanism.

Many potentially unsafe scenarios can arise when using a traditional carabiner. As illustrated in FIG. 1, the locking carabiner 100 attaches belay device 122 to belay loop 119 on climbing harness 114. Rope 124 is threaded through the belay device 122 in a manner to enable a controlled rappel by the climber. The carabiner 100 is rotated in the belay loop 119 causing the belay device 122 to load the carabiner 100 along weaker minor axis 108. The belay device 122 is bearing directly against the screw locking mechanism 112 and the gate 104. The cross-loaded configuration illustrated in FIG. 1 may cause the screw locking mechanism 112 and/or the gate 104 to break, potentially having catastrophic consequences for the climber.

European Patent Application EP 0976936 discloses carabiner 126 having a generally C-shaped body 128, a gate 130 with a locking mechanism 138, and a lateral support member 132 as illustrated in FIGS. 2 and 3. The locking mechanism 138 is moved upward in direction 140 and screwed in direction 142 to securely lock the gate 130. The lateral support member 132 rotates about the spine of the C-shaped body 128 and snaps over the gate 130 and the locking mechanism 138 to divide opening 150 into a first portion 144 and a second portion 145. The carabiner disclosed in EP 0976936 corresponds generally to a carabiner sold under the name "Belay Master" by DMM International of Great Britain.

As illustrated in FIG. 3, first portion 144 of opening 150 is attached to a belay loop 146 of a climbing harness. Rope 148 and belay/rappel device 152 are threaded through second portion 145 of the opening 150. The lateral support member 132 prevents the carabiner 126 from rotating in the belay loop 146 to an orientation such that it may be cross-loaded along its minor axis. Furthermore, because the lateral support member 132 covers the gate 130, it is protected from another object (e.g., another carabiner, etc.) from bearing directly against the gate 130.

Operating the carabiner 126 requires two sequential steps. The gate 130 cannot be opened unless the lateral support member 132 is first disengaged. The belay loop 146 and rope 148 must all be located in the opening 150 before the lateral support member 132 can be engaged with the gate 130. That is, the user can not access portion 145 of the opening 150 without disengaging the lateral support member 132. As a result, there is a risk that the belay loop 146 and/or rope 148 may end up in the wrong portions (i.e., 144 or 145) of the opening 150. Also, the lateral support member 132 rotates perpendicular to the plane of the carabiner 126, while the gate 130 moves in the plane of the carabiner 126. Manipulating the carabiner 126 in two planes is more difficult than a single plane of operation, especially while wearing gloves. The protruding lateral support member 132 may also interfere with other climbing equipment.

U.S. Publication No. US2003/0167608 (hereinafter "the '608 Application") discloses carabiner 154 with a generally C-shaped body 156 and a gate 158 that pivots about pin 164, as illustrated in FIGS. 4 and 5. The locking mechanism 160 includes lateral support member 162 extending from the gate 158 and engaging spine 174 of the C-shaped body 156. When the gate 158 is closed and the lateral support member 162 rotates back into the plane of the body 156 and divides opening 161 into first portion 172 and second portion 173.

As illustrated in FIG. 5, in order to open the carabiner 154, the locking mechanism 160 must be released and rotated in direction 170. As a result, the user can not access the portion 173 of the opening 161 without disengaging the lateral support member 162. All the belay devices, ropes, and harness loops must be located in the opening 161 before the lateral support member 162 is engaged, creating the risk that these elements end up in the wrong portions (i.e., 172 or 173) of the opening 161. Also, the lateral support member 162 rotates outside of the plane of the C-shape body 156, creating handling problems and potentially interfering with other climbing equipment. Finally, there is a potential danger that a climber may inadvertently sandwich the belay loop of a climbing harness between the body 156 and the lateral support member 162, thereby increasing the risk of cross-loading.

U.S. Pat. No. 7,228,601 (Thompson) discloses various embodiments of anti-cross loading features for carabiners. FIG. 6 illustrates carabiner 176 having a generally C-shaped body 178, a gate 182 including a locking mechanism 188, and a lateral support member 194. The gate 182 is secured to end region 184 of the body 178 by a pin 200 (e.g., a rivet, screw, etc.). The gate 182 is rotatable about pin 200 to enable the gate 182 to open and close manually along the general arc 189. In the closed position depicted in FIG. 6, a slot in the gate 182 receives an end region 186 of the body 178.

The lateral support member 194 divides the opening 180 into a first portion 190 and a second portion 192. The lateral support member 194 can be opened by urging it upward in axial direction 206 along the longitudinal slot 205 until the securing element 196 bears against base of lateral slot segment 203 of the L-shaped slot 202. The dimensions of the lateral support member 194 are such that when it is moved upward it does not interfere with the gate 182 in the closed position. The lateral support member 194 may then be rotated in the direction 204 within an arc provided by the lateral slot segment 203.

In order to obtain access to the first portion 190, the lateral support member 194 is rotated out of the plane of the body portion 178. The gate 182 is operated separately from the lateral support member 194 in a two-step process. In particular, the carabiner 176 has two separate locking mechanisms 188, 202 for the user to operate. Because the lateral support member 194 extends between fixed locations on the body portion 178, the first portion 190 is relatively small compared to the entire opening 180, and may be inadequate for some applications.

In another embodiment of Thompson illustrated in FIG. 7, carabiner 236 has a body 178, an arm member 227', and a locking mechanism 240. The arm member 227', shown in a closed, locked position, is attached to the end region 184 of the body 178 and manually rotatable thereabout along an arc in direction 232. The locking mechanism 240 includes an opening 250 configured for receiving the arm member 227'. The opening 250 comprises a restricted portion 255, configured to engage a distal end 229 of the arm member 227' to prevent rotation. The opening 250 further includes a non-restrictive portion 257, configured to enable the arm member 227' to rotate between an open and a closed position. The locking mechanism 240 may be twisted about the elongated section 212 of the body 178 between a locking position, with the distal end 229 of the arm member 227' engaged within the restricted portion 255 as shown, and an unlocking position, with the non-restrictive portion 257 of the opening 250 housing the distal end 229 of the arm member 227', enabling rotation thereof.

As with the other embodiment discussed above, the arm 227' extends between fixed locations on the body portion 178, so the first portion 252 is relatively small compared to the entire opening 250. The gate (not shown) is operated separately from the arm 227' in a two-step process. In order to be used for belaying or rappelling applications, the gate requires a locking mechanism, so that the carabiner 236 has two separate locking mechanisms for the user to operate.

BRIEF SUMMARY OF THE INVENTION

The present invention is directed to a carabiner with an anti-cross loading feature that operates similar to a conventional locking carabiner. The various embodiments emphasize simplicity and ease of use, while providing the benefit of an anti-cross loading feature. The present carabiners permit one handed operation and typically do not require more steps to operate than a conventional carabiner. In some embodiments, the present anti-cross loading feature converts a non-locking carabiner into a locking carabiner suitable for belaying and rappelling.

The anti-cross loading feature includes a secondary gate attached to the primary gate. The secondary gate is adapted to divide an interior region of the carabiner into a first portion and a second portion. The secondary gate and the primary gate are preferably displaced in the same or parallel planes. A single locking mechanism acts to secure both the primary gate and the secondary gate. Coupling the secondary gate to the primary gate facilitates one handed operation and minimizes or eliminates additional actions by the user in order to operate.

In one embodiment, the carabiner includes a generally C-shaped body including a first end and a second end located on opposite sides of an opening. A primary gate is mounted to the second end. The primary gate is rotatable about a first axis perpendicular to a plane that bisects the C-shaped body. The primary gate is rotatable between a closed position with the primary gate engaged with the first end and the C-shaped body enclosing an interior region, and an open position with the primary gate located generally in the interior region. A first end of a secondary gate is attached to the primary gate. A second free end of the secondary gate includes a portion adapted to engage an interior surface of the C-shaped body. The portion of the second free end is constrained to move only in the interior region. The secondary gate is adapted to be displaced in the plane relative to the primary gate between a closed configuration that divides the interior region into a first portion and a second portion, and an open configuration where the interior region is accessible through the opening. Displacement or movement of the secondary gate can include rotation and/or translation.

The secondary gate is adapted to not interfere with rotation of the primary gate between the open position and the closed position. The secondary gate is adapted to move between the open configuration and the closed configuration as the primary gate moves between the open position and the closed position. The secondary gate is also adapted to move in the plane to extend across the interior region as the primary gate rotates between the open position and the closed position. In one embodiment, the portion of the secondary gate is biased to slide along the interior surface of the C-shaped body as the primary gate rotates between the closed position and the open position.

The secondary gate is preferably biased toward one of the closed configuration or the open configuration. In one embodiment, the secondary gate is attached proximate a distal end of the primary gate. The second distal end of the secondary gate is preferably advanced toward the second end of the C-shaped body in the open configuration. In another embodiment, the second free end of the secondary gate includes lateral stabilization portions extending beyond the interior region when the portion of the secondary gate is engaged with the interior surface of the C-shaped body. In another embodiment, the secondary gate is biased toward the open configuration and a locking mechanism on the primary gate simultaneously advances the secondary gate toward the closed configuration as the locking mechanism is advanced toward a locked position.

At least one stop is preferably located on one or more of the primary gate and the C-shaped body to limit displacement of the secondary gate to the closed configuration. A single locking mechanism preferably retains the primary gate in the closed position and the secondary gate in the closed configuration. In one embodiment, the locking mechanism engages with the primary gate and retains the secondary gate in the closed configuration. In another embodiment, the locking mechanism engages with the secondary gate and retains the primary gate in the closed position. In another embodiment, the secondary gate slides generally along an axis of the primary gate between the open configuration and the closed configuration.

In another embodiment, the secondary gate includes a first end pivotally attached to the primary gate and a second free end. The secondary gate is adapted to be displaced in the plane relative to the primary gate between a closed configuration that divides the interior region into a first portion and a second portion, and an open configuration where the interior region is accessible through the opening. The second free end of the secondary gate located outside of the interior region in both the open configuration and the closed configuration.

In one embodiment, the secondary gate includes a U-shaped wire structure that is adapted to extend around an outer perimeter of a spine of the C-shaped body in the closed configuration. The secondary gate is adapted to move between the open and closed configurations as the primary gate moves between the open and closed positions. In another embodiment, the secondary gate is biased to the closed configuration and slides along a stop on a spine of the C-shaped body as the primary gate rotates between the closed position and the open position. An engagement structure is optionally located on the C-shaped body that retains the secondary gate in the closed configuration. The secondary gate preferably rotates at least 180 degrees between the open configuration and the closed configuration.

The present invention is also directed to a method of making a carabiner. The method includes the steps of mounting a primary gate to a second end of a generally C-shaped body for rotation about a first axis perpendicular to a plane that bisects the C-shaped body. The primary gate is rotatable between a closed position with the primary gate engaged with a first end of the C-shaped body, and an open position with the primary gate located in an interior region of the C-shaped body. A first end of a secondary gate is attached to the primary gate so that a portion of a second free end of the secondary gate can engage an interior surface of the C-shaped body. The secondary gate is adapted to be displaced in the plane relative to the primary gate between a closed configuration that divides the interior region into a first portion and a second portion, and an open configuration where the interior region is accessible through the opening. The portion of the second free end is constrained to move only in the interior region.

DETAILED DESCRIPTION OF THE INVENTION

Figure 1:
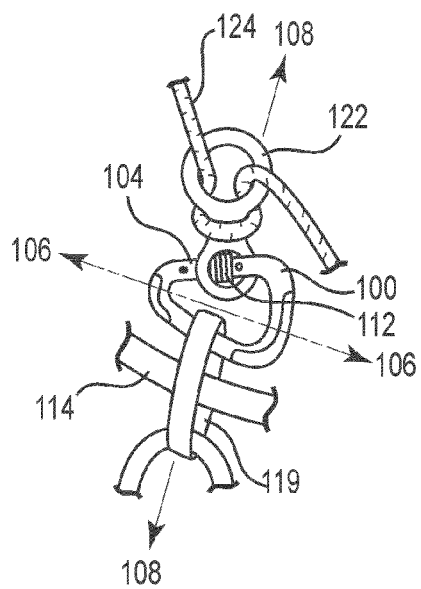
FIG. 1 illustrates a belay device cross-loading a prior art carabiner.
Figure 2:
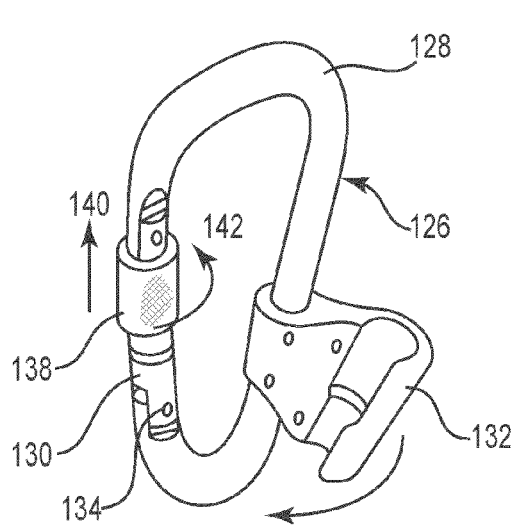
FIGS. 2 and 3 illustrate a prior art carabiner with a lateral support member pivotally attached to the spine.
Figure 3:
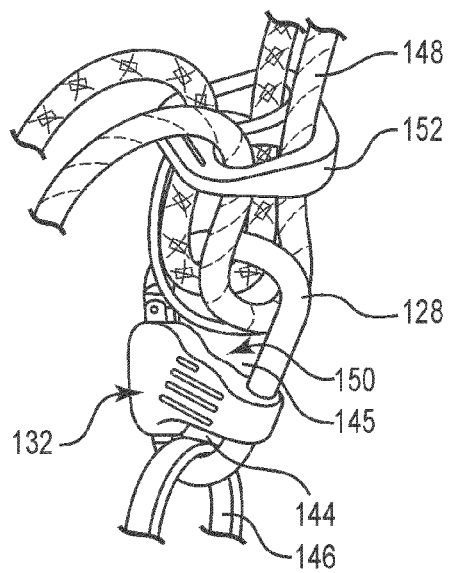
Figure 4:
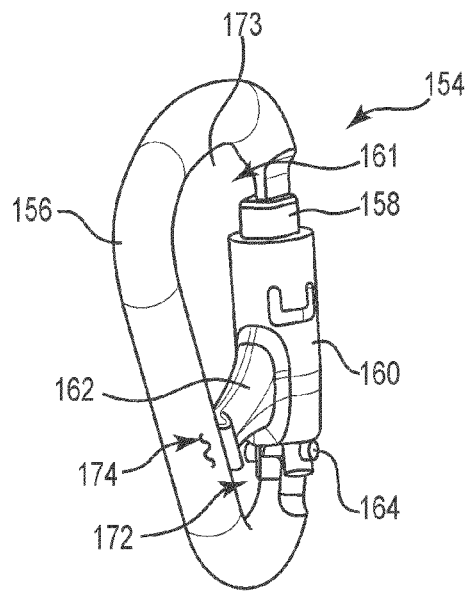
FIGS. 4 and 5 illustrate prior art a carabiner with a lateral support member that rotates with the gate locking mechanism.
Figure 5:
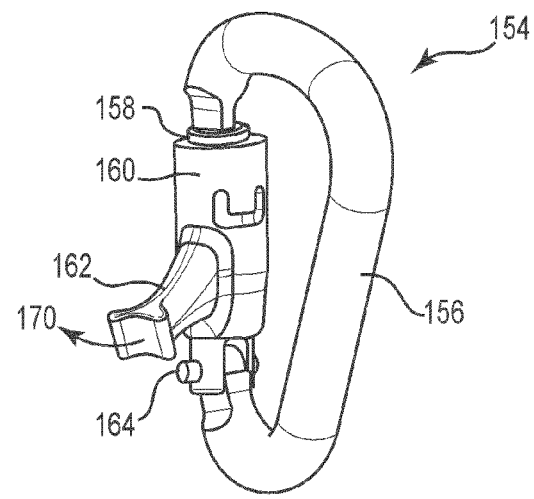
Figure 6:
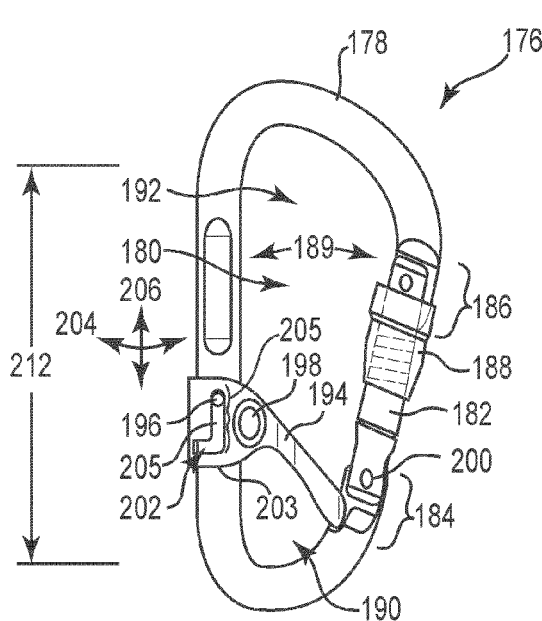
FIG. 6 illustrates a prior art carabiner with a lateral support member that engages with the body portion of the carabiner.
Figure 7:
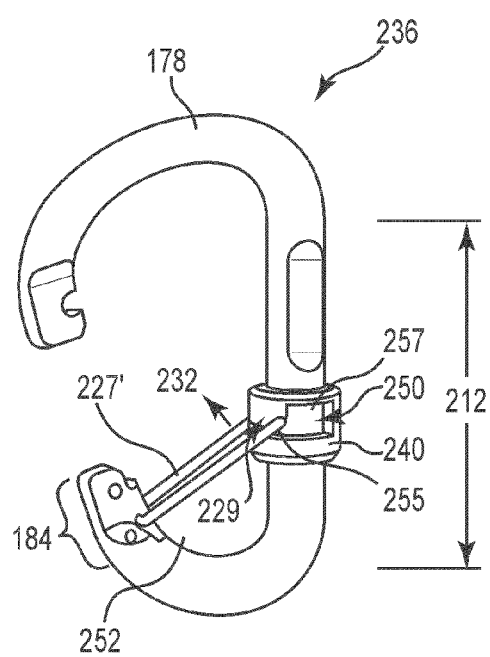
FIG. 7 illustrates an alternate prior art carabiner with a lateral support member that engages with the body portion of the carabiner.

FIGS. 8 through 11 are directed to a carabiner 300 with anti-cross loading feature 302 in accordance with an embodiment of the present invention. The carabiner 300 includes a generally C-shaped body 304 with a first end 306 and a second end 308 located on opposite sides of opening 309. As used here, "generally C-shaped" refers to an incomplete loop that tends to close on itself, and not to the particular geometry of the body. As such, generally C-shaped describes most commercially available carabiners, such as for example, oval, D-shaped, pear-shaped, offset D-shaped, and irregular shaped, as that phrase is used herein.

Primary gate 310 is pivotally attached to the second end 308 by pivot pin 312. The primary gate 310 rotates around axis of rotation B (see FIG. 11) of the pivot pin 312 between open position 314 illustrated in FIG. 8 and closed position 316 illustrated in FIGS. 9 and 10. In the illustrated embodiment, the primary gate 310 is a straight gate, although a bent gate or wire gate can also be used for this purpose.

The primary gate 310 is preferably biased to the closed position 316. In the illustrated embodiment, the interface of distal end 318 of the primary gate 310 and the first end 306 of the body 304 is configured as a conventional key-lock carabiner. Since the open position 314 is a matter of degree, open position 314 refers to a configuration where gap 315 between the distal end 318 of the primary gate 310 and the first end 306 of the C-shaped body 304 is sufficient to permit other devices or objects to pass.

Secondary gate 320 is pivotally attached to the primary gate 310, preferably proximate the distal end 318. The secondary gate 320 can be displaced relative to the primary gate 310, primarily by rotation around axis of rotation C (see FIG. 11). In the illustrated embodiment, the secondary gate 320 rotates around the pivot point 313 between open position 314 illustrated in FIG. 8 and closed position 316 illustrated in FIG. 10. The secondary gate 320 can be rigid or flexible (see e.g., FIG. 8B). Since even a rigid wire gate may flex when subjected to a sufficient load, displacement or movement of the secondary gate can include rotation around an axis or pivot point, translational movement due to flexure or elastic bending, or a combination thereof.

In the illustrated embodiment, the secondary gate 320 is a generally U-shaped wire structure that engages with holes 313 in distal end 318 of the primary gate 310. The U-shaped wire structure is advantageous for the present embodiment because the secondary gate 320 can be folded against the primary gate 310 in a compact configuration that does not interfere with access to the interior region 322, as illustrated in FIG. 8.

Figure 11:
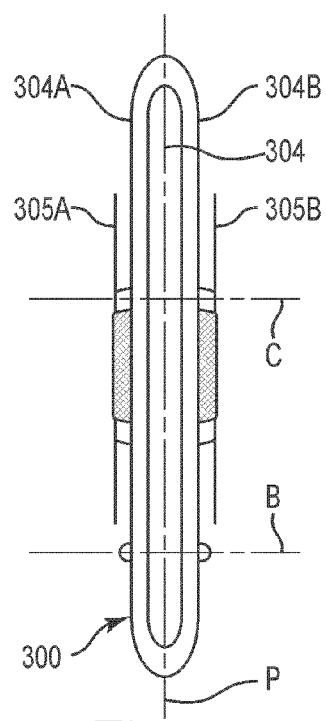
FIG. 11 is a rear end view of the carabiner of FIG. 8.

As illustrated in FIG. 11, plane P generally bisects or divides the C-shaped body 304 into two generally equal or congruent parts 304A, 304B. The axis of rotation B is generally perpendicular to the plane P. Consequently, the primary gate 310 (or a central axis of the primary gate 310) preferably rotates in the plane P or a plane parallel to plane P. The axis of rotation C of the secondary gate 320 is also generally perpendicular to the plane P. Consequently, the secondary gate 320 (or a central axis of the secondary gate 320) is preferably displaced in the plane P or a plane parallel to plane P.

The anti-cross loading feature 302 preferably has a single plane of operation. As used herein, "single plane of operation" refers to the same plane or closely parallel planes. For most applications where the gates 310, 320 are displaced in different, but parallel planes, both planes are located within the outer boundaries of the carabiner 300, defined by planes 305A, 305B parallel to plane P. For the embodiment of FIGS. 19-21, both planes are located within the outer boundaries defined by the secondary gate 504.

Figure 8:
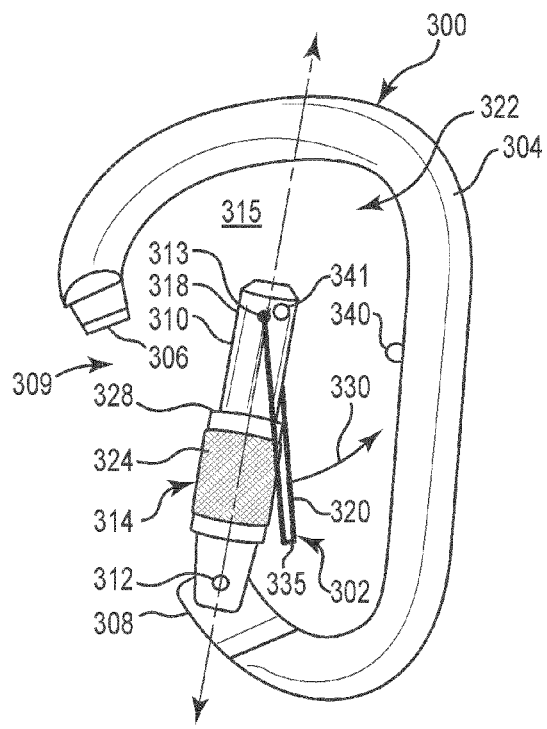
FIG. 8 illustrates an anti-cross loading feature in an open position located within an interior region of a carabiner in accordance with an embodiment of the present invention.

The secondary gate 320 is preferably biased toward the primary gate 310, as illustrated in FIG. 8. Consequently, when the primary gate 310 is in the open position 314, the entire interior region 322 is accessible without requiring any further action by the user. In this respect, the carabiner 300 requires no further steps to operate than a conventional locking carabiner, permitting one handed operation.

The primary gate 310 includes locking mechanism 324 that can be displaced along axis A toward the distal end 318. When in the fully locked position 326 illustrated in FIG. 10 the locking mechanism 324 locks the distal end 318 to the first end 306 of the body 304, as in a conventional carabiner. In one embodiment, the locking mechanism 324 is biased toward the distal end 318. In another embodiment, the locking mechanism 324 is threaded and is displaced when rotated, such as in a conventional screw gate carabiner. An auto locking mechanism may also be used.

Figure 9:
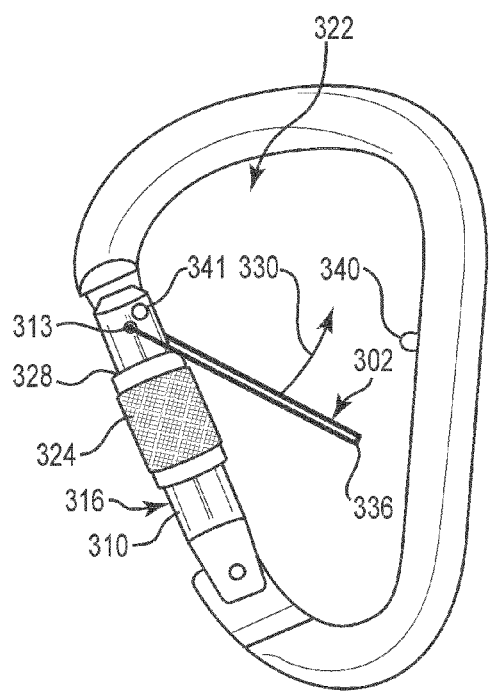
FIG. 9 illustrates the carabiner of FIG. 8 during the locking sequence in accordance with an embodiment of the present invention.

In the open position 314 illustrated in FIG. 8 the locking mechanism 324 is displaced toward pivot pin 312. The secondary gate 320 preferably has a range of travel that permits it to contact the locking mechanism 324, minimizing interference with the interior region 322. As the locking mechanism 324 is advanced toward the distal end 318 of the primary gate 310, as illustrated in FIG. 9, leading edge 328 of the locking mechanism 324 engages the secondary gate 320 and rotates it in direction 330.

Figure 10:
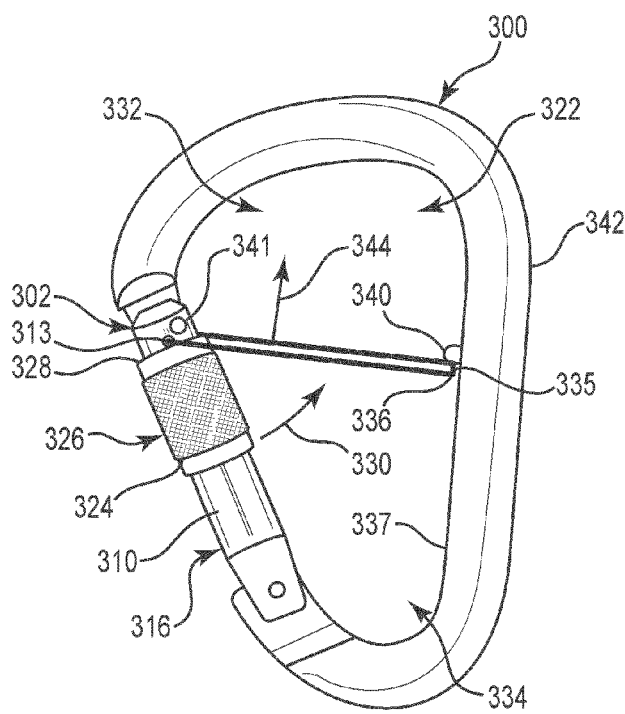
FIG. 10 illustrates the carabiner of FIG. 8 in the locked position in accordance with an embodiment of the present invention.

When the locking mechanism 324 is advanced to the fully locked position 326 illustrated in FIG. 10, the secondary gate 320 is positioned across the interior region 322. The secondary gate 320 divides that interior region 322 into first portion 334 and a second portion 332. In one embodiment, portion 335 at free end 336 of the secondary gate 320 engages with stop 340 on the spine 342 of the body 304. In another embodiment, the secondary gate 320 engages the spine 342 at an acute angle which prevents further rotation in the direction 330. Free end 336 of the secondary gate 320 preferably has a shape complementary to a shape of the spine 342 at the location of engagement with the stop 340 (see e.g., FIG. 13). In yet another embodiment, the secondary gate 320 engages with stop 341 on the primary gate 310. Locating the stop 341 on the primary gate permits a standard C-shaped body 304 to be used for the present carabiner 300. The various stops can be used alone or in combination.

In one embodiment, the locking mechanism 324 is advanced further along the axis A after the secondary gate 320 engages the stop 340. As a result, the secondary gate 320 is flexed slightly in direction 344. In the flexed configuration, the secondary gate 320 applies a force on the locking mechanism 324 that increases friction between the components, reducing the risk of inadvertent rotation of the locking mechanism 324. Since the secondary gate 320 is intended to deflect ropes, belay devices and the like into their respective portions 332, 334, and not to carry large loads, the locking mechanism 324 for the secondary gate 320 does not need to be as robust as the locking mechanism 324 for the primary gate 310.

Figure 8A:
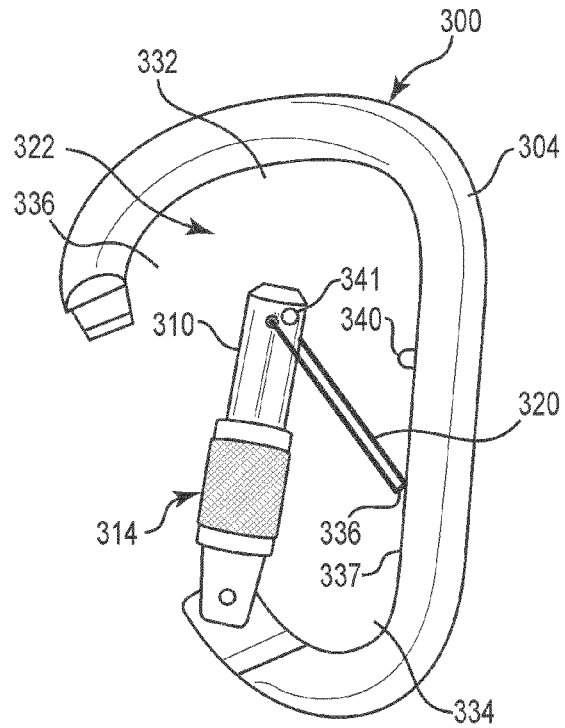
FIG. 8A illustrates an alternate mode of operating the carabiner of FIG. 8 in accordance with an embodiment of the present invention.
Figure 9A:
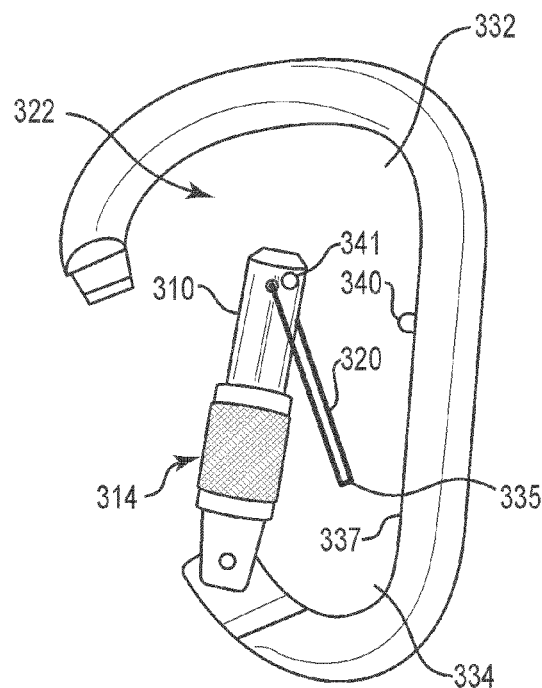
FIG. 9A illustrates an alternate mode of operating the carabiner of FIG. 8 in accordance with an embodiment of the present invention.

FIGS. 8A and 9A illustrate an alternate mode of operating the carabiner 300. The secondary gate 320 is biased toward the closed position 316 illustrated in FIG. 10. When the primary gate 310 is in the open position 314, the biasing force urges the portion 335 at the free end 336 of the secondary gate 320 against interior surface 337 of the body 304.

As the primary gate 310 is moved between the open position 314 and the closed position 316 (see FIG. 10), the portion 335 slides along the interior surface 337. The biasing force causes the secondary gate 320 to extend across the interior region 322 as the primary gate 310 moves between the open position 314 and the closed position 316 (see FIG. 10), although the size and shape of the portions 332, 334 change as the primary gate 310 is moved between the open position 314 and the closed position 316.

With the primary gate 310 in the open configuration 314, the user can pass items, such as a belay loop through the second portion 332, and into the first portion 334 by temporarily overcoming the biasing force on the secondary gate 320, as illustrated in FIG. 9A. Once the belay loop is located in the first portion 334, the biasing force snaps the secondary gate 320 back into engagement with the interior surface 337, as illustrated in FIG. 8A. The user can then move ropes and belay devices into and out of the second portion 332 without affecting the first portion 334. The secondary gate 320 can then be locked into the closed position 316 as discussed in connection with FIG. 10.

Biasing the secondary gate 320 toward the closed position 316 has the added advantage of supplementing the biasing force acting on the primary gate 310. The embodiment of FIGS. 8A and 9A can be operated with one hand, and does not require the user to take any action to operate the secondary gate 320.

Figure 8B:
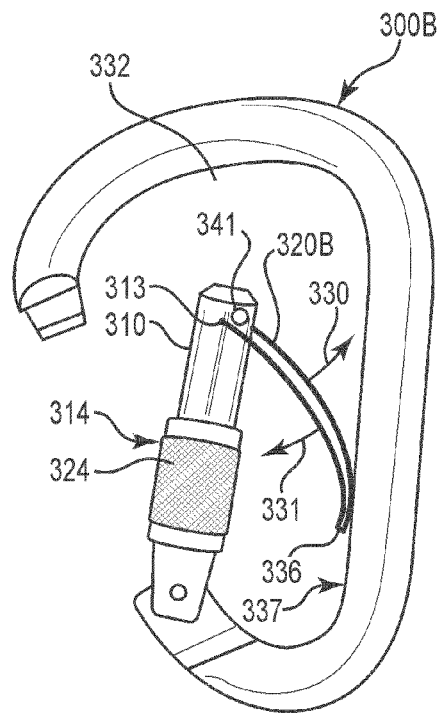
FIG. 8B illustrates an alternate embodiment of the carabiner of FIG. 8 with a flexible secondary gate in accordance with an embodiment of the present invention.
Figure 9B:
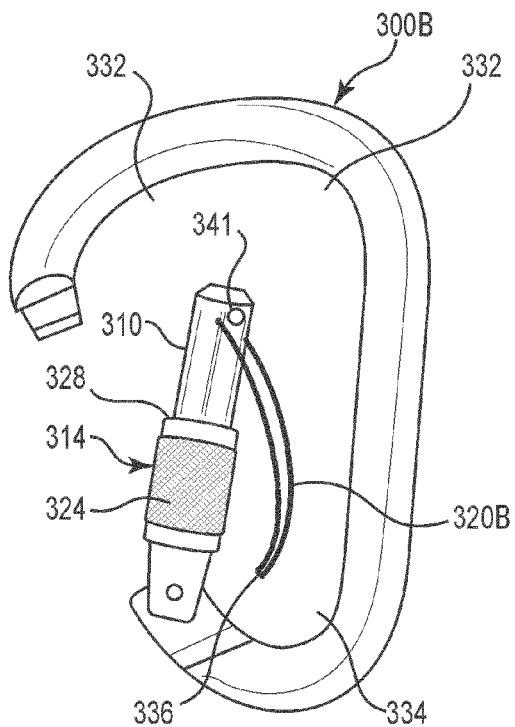
FIG. 9B illustrates the carabiner of FIG. 8B with the secondary gate in an open position accordance with an embodiment of the present invention.
Figure 10B:
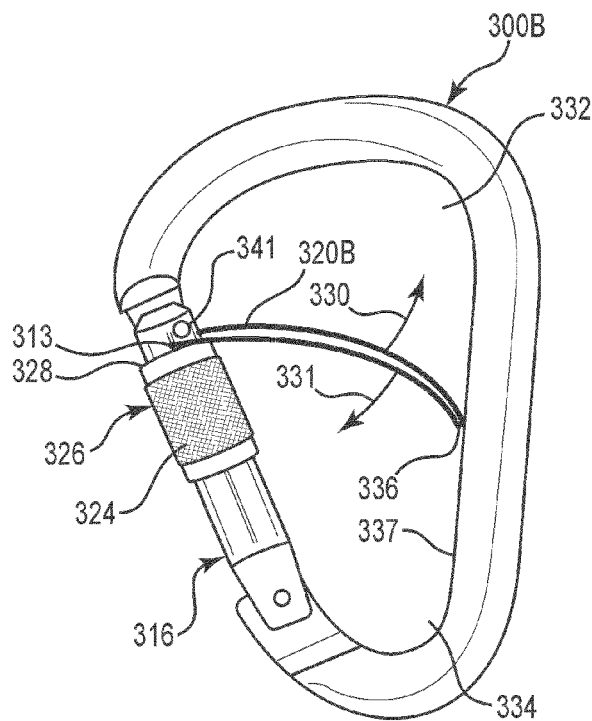
FIG. 10B illustrates the carabiner of FIG. 8B with the secondary gate in a closed position accordance with an embodiment of the present invention.

FIGS. 8B, 9B and 10B illustrate alternate embodiments of the carabiner 300B. In the first embodiment, the secondary gate 320B is constructed with a curved shape. The secondary gate 320B is preferably flexible, so that displacement in direction 331 can be rotation around pivot point 313 and/or translation due to flexure of the secondary gate 320B. Alternatively, secondary gate 320B is pivotally attached at the location 313, but is permitted a limited range of rotation. The locking mechanism 324 and stop 341 operate as discussed above. The curvature of the secondary gate 320B facilitates sliding of the free end 336 on the surface 337. The leading edge 328 of the locking mechanism 324 engages the secondary gate 320B and rotates it in direction 330, as discussed above. Operation of the carabiner 300B can be in accordance with any of the embodiments discussed herein. The secondary gate 320B is preferably biased in the direction 330.

In another embodiment, the secondary gate 320B is fixedly attached to the primary gate 310 at the location 313, such as by spot welding. In both of these embodiments, displacement in the direction 331 is primarily or exclusively translation due to flexure of the secondary gate 320B. Flexure can occur along the full length of the secondary gate 320B or it can be constructed to facilitate preferential bending in selected locations. When the locking mechanism 324 is in the fully locked position 326 illustrated in FIG. 10B, the surface 328 provides additional support to the connection at the location 313, although the secondary gate 320B may still flex in the directions 330, 331.

With the primary gate 310 in the open configuration 314 as illustrated in FIG. 8B, a user can pass items, such as a belay loop through the second portion 332 and into the first portion 334 by temporarily flexing the secondary gate 320B, as illustrated in FIG. 9B. Once the belay loop is located in the first portion 334, the elastic force snaps the secondary gate 320B back into engagement with the interior surface 337, as illustrated in FIG. 8B. The user can then move ropes and belay devices into and out of the second portion 332 without affecting the first portion 334.

The secondary gate 320B also biases the primary gate 310 toward the closed position 316 illustrated in FIG. 10B, supplementing the biasing force acting on the primary gate 310. The embodiment of FIGS. 8B, 9B and 10B can be operated with one hand, and does not require the user to take any action to operate the secondary gate 320B.

Figure 14:
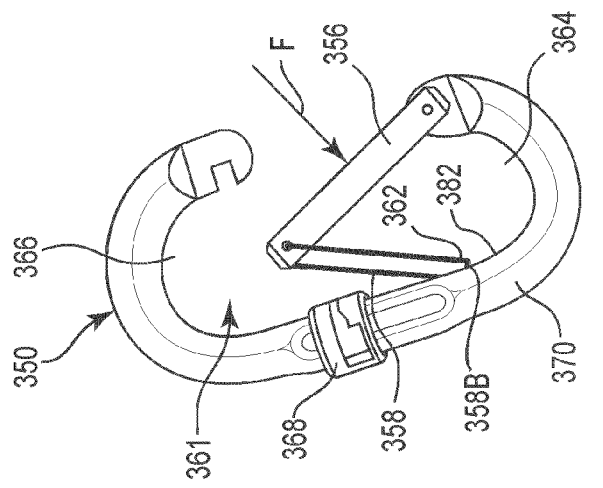
FIGS. 12 through 14 illustrate an alternate anti-cross loading feature generally located within an interior region of a carabiner in accordance with an embodiment of the present invention.
Figure 13:
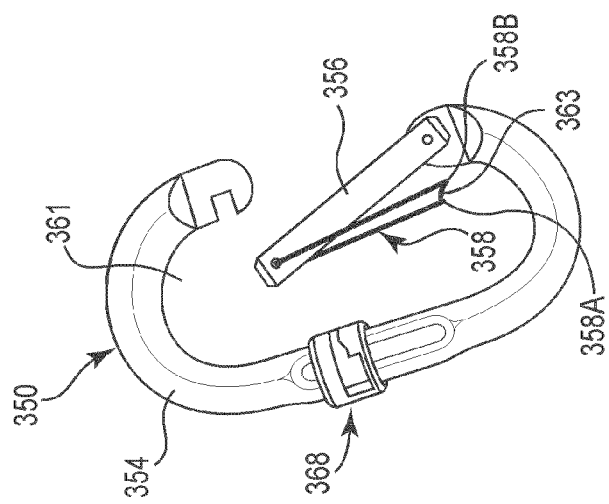
Figure 12:
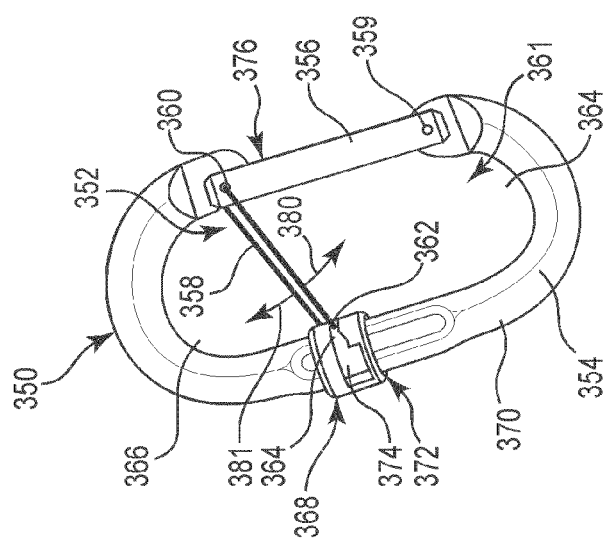

FIGS. 12 through 14 are directed to an alternate carabiner 350 with an anti-cross loading feature 352 in accordance with an embodiment of the present invention. The body 354 and the primary gate 356 correspond to a conventional D-shaped non-locking carabiner.

Secondary gate 358 is pivotally attached to the primary gate 356. Although the embodiment of FIGS. 12-14 illustrates the secondary gate 358 attached near distal end 360 of the primary gate 356, the location of attachment can be moved closer to pivot pin 359 for some applications without departing from the scope of the present embodiment. In the illustrated embodiment, the primary gate 356 and the secondary gate 358 are both biased toward the closed position 376 illustrated in FIG. 12. In the closed position 376 the secondary gate 358 divides the interior region 361 into first portion 364 and second portion 366. The secondary gate 358 preferably rotates in the same plane as the primary gate 356, as discussed above.

Locking mechanism 368 is located on the spine 370 of the body 354. Free end 362 of the secondary gate 358 is adapted to engage with narrow slot 364 on the locking mechanism 368. In the illustrated embodiment, the free end 362 includes curved portion 363 generally corresponding to the cross-sectional shape of the spine 370 and/or the cross-sectional shape of the locking mechanism 368 in the region of the narrow slot 364. In the locked position 372 illustrated in FIG. 12, the narrow slot 364 captures the free end 362 and prevents the secondary gate 358 from rotating in direction 380. The geometry of the carabiner 350 and the length of the secondary gate 358 prevent rotation in the opposite direction 381. The locking mechanism 368 is preferably biased into the locked position 372 illustrated in FIG. 12. Consequently, the secondary gate 358 blocks movement of the primary gate 356 and converts a non-locking carabiner into a locking carabiner.

The locking mechanism 368 can be rotated relative to the spine 370 so that wider slot 374 is positioned opposite the free end 362 of the secondary gate 358, permitting the secondary gate 358 to disengage from the locking mechanism 368 and to rotate in the direction 380. As illustrated in FIG. 13, the secondary gate 358 can be manually rotated toward the primary gate 356, providing access to the entire interior region 361.

It is not necessary, however, for the user to displace the secondary gate 358 toward the primary gate 356 as illustrated in FIG. 13. Rather, once the secondary gate 358 is release from the locking mechanism 368, the free end 362 slides along inner surface 382 of the spine 370 as the primary gate 356 is opened and closed. In particular, the curved portion 363 slides on the inner surface 382. The portion 363 is constrained to move only in the interior region 361, although lateral stabilization portions 358A, 358B of the secondary gate 358 extend beyond the interior region 361 when the portion 363 is engaged with the spine 370. The lateral stabilization portions 358A, 358B provide lateral stability during sliding, as illustrated in FIG. 14.

Once the primary gate 356 is opened, items such as ropes, belay devices, belay loops, and the like can be passed through the second portion 366 and into the first portion 364 of the interior region 361 by simply overcoming the biasing force acting on the secondary gate 358, as illustrated in FIG. 14. Since the secondary gate 358 is biased toward the inner surface 382, it immediately snaps back into engagement with the interior surface 382 of the spine 370 after being displaced.

The carabiner 350 is preferably self-locking. In particular, once force F applied by a user (see FIG. 14) is removed from the primary gate 356, the biasing mechanisms close the primary gate 356 and the secondary gate 358. Free end 362 of the secondary gate 358 preferably snaps back into engagement with the narrow slot 364 on the locking mechanism 368. Alternatively, the user must rotate the locking mechanism 368 to engage the free end 362 with the narrow slot 364, similar to a conventional twist lock carabiner.

In another embodiment, the locking mechanism 368 can be temporarily rotated with the wider slot 374 positioned to engage free end 362 of the secondary gate 358. When the biasing mechanisms snap the free end 362 into engagement with the wider slot 374, the locking mechanism 368 automatically rotates so that the free end 362 is restrained by the narrow slot 364, as illustrated in FIG. 12. The embodiment of FIGS. 12-14 can be operated with one hand and does not require any special handling of the secondary gate 358.

Figure 15:
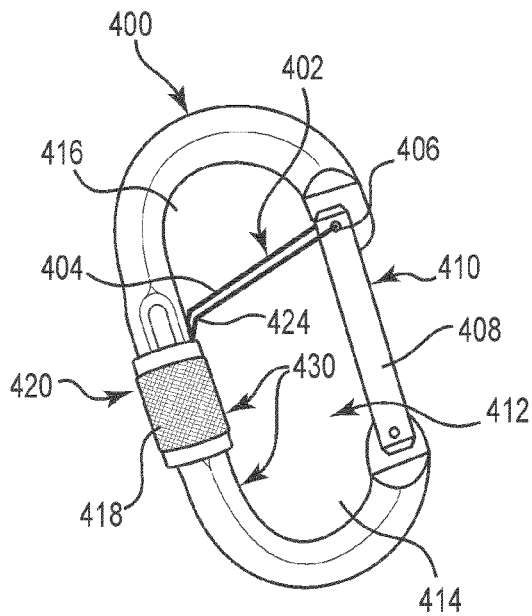
FIGS. 15 and 16 illustrate an alternate anti-cross loading feature generally located within an interior region of a carabiner in accordance with an embodiment of the present invention.
Figure 16:
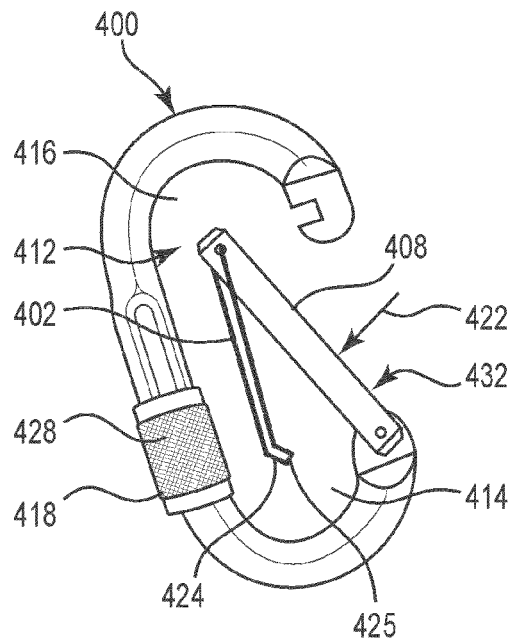

FIGS. 15 and 16 are directed to an alternate carabiner 400 with an anti-cross loading feature 402 in accordance with an embodiment of the present invention. The secondary gate 404 is pivotally attached to distal end 406 of the primary gate 408. The secondary gate 404 preferably rotates in the same plane as the primary gate 408, as discussed above.

In the illustrated embodiment, the primary gate 408 and the secondary gate 404 are both biased toward the closed position 410 illustrated in FIG. 15. In the closed position 410 the secondary gate 404 divides the interior region 412 into first portion 414 and second portion 416. Operation of the carabiner is similar to that discussed in connection with FIGS. 8A and 9A. In particular, the free end 424 preferably slides along inner surfaces 430 of the carabiner 400 as the primary gate 408 moves between open position 432 illustrated in FIG. 16 and the closed position 410 illustrated in FIG. 15. The free end 424 is constrained to move only in the interior region 412.

Locking mechanism 418 is preferably biased to the closed position 420 illustrated in FIG. 15. When force 422 applied by a user is removed from the primary gate 408, the biasing mechanisms close the primary gate 408 and the secondary gate 404. In the preferred embodiment, curved or angled portion 425 at the free end 424 snaps into engagement with the locking mechanism 418.

In an alternate embodiment, the user must move the locking mechanism 418 toward the unlocked position 428 illustrated in FIG. 16 so that the biasing force can move the secondary gate to the closed position 410. The user then releases the locking mechanism 418, which engages with the curved portion 425 at the free end 424 of the secondary gate 404.

In the locked configuration illustrated in FIG. 15, the non-locking carabiner is converted to a locking carabiner. The carabiner 400 requires no further steps or actions to operate than a conventional carabiner, except that the carabiner 400 has the benefit of the anti-cross loading feature 402.

Figure 17:
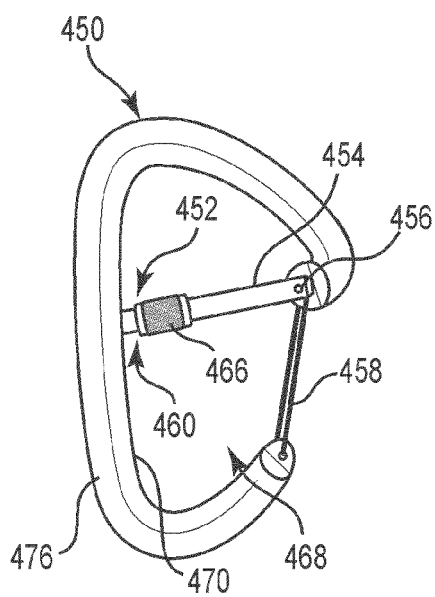
FIGS. 17 and 18 illustrate an alternate anti-cross loading feature generally located within an interior region of a carabiner in accordance with an embodiment of the present invention.
Figure 18:
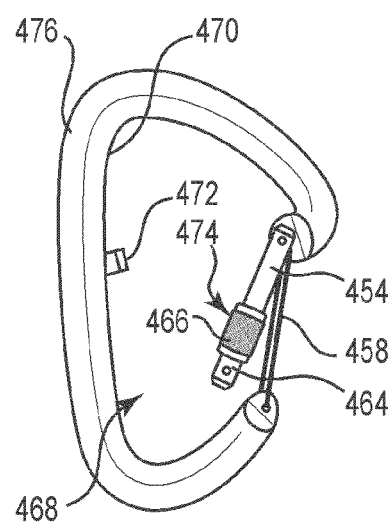

FIGS. 17 and 18 are directed to an alternate carabiner 450 with anti-cross loading feature 452 in accordance with an embodiment of the present invention. Secondary gate 454 is pivotally attached to distal end 456 of the primary gate 458. The secondary gate 454 preferably rotates in the same plane as the primary gate 458. In the illustrated embodiment, the primary gate 458 and the secondary gate 454 are both biased toward the closed position 460 illustrated in FIG. 17.

The primary gate 458 is a wire structure and the secondary gate 454 includes portion 464 that is adapted to engage the inner surface 470 of spine 476. The portion 464 is constrained to move only in the interior region 468. In the illustrated embodiment, portion 464 is a conventional key-lock locking structure with a threaded locking mechanism 466. The corresponding key member 472 is preferably formed on interior surface 470 of the spine 476. The secondary gate 454 can be folded against the primary gate 458 to maximize the size of the interior region 468. The locking mechanism 466 turns a non-locking, wire-gate carabiner into a locking carabiner. The distal end 464 preferably slides along inner surface 470 of the carabiner 450 as the primary gate 458 moves between the open position and the closed position.

In an alternate embodiment, the primary gate 458 is biased toward the closed position 460 and the secondary gate 454 is biased to the open position 474 illustrated in FIG. 18. In this embodiment, the secondary gate 454 moves with the primary gate 458 and does not obstruct the interior region 468. The user manually displaces the secondary gate 454 to the locked position 460 and/or extends the secondary gate 454 across the interior region 468.

Figure 19:
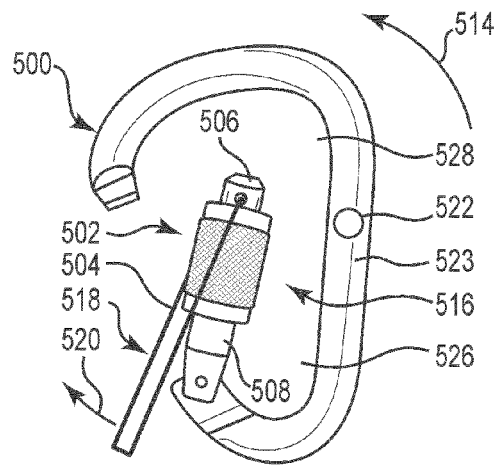
FIGS. 19 and 21 illustrate a carabiner with an anti-cross loading feature that slides past the spine of the carabiner in accordance with an embodiment of the present invention.
Figure 20:
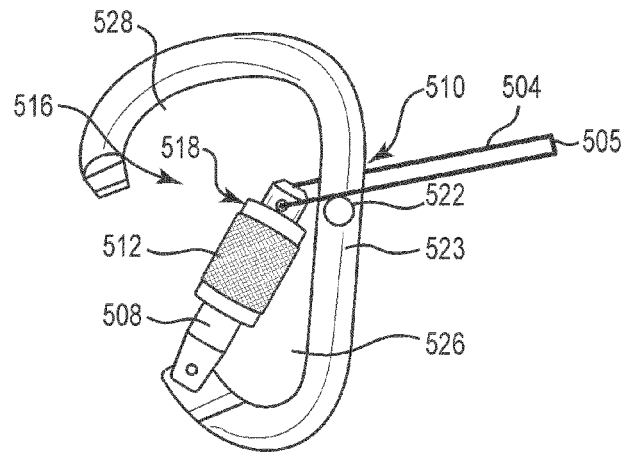
Figure 21:
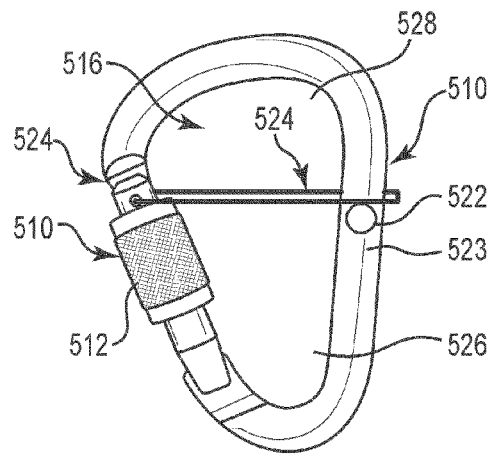

FIGS. 19 through 21 are directed to an alternate carabiner 500 with anti-cross loading feature 502 in accordance with an embodiment of the present invention. Secondary gate 504 is pivotally attached to distal end 506 of the primary gate 508. As best illustrated in FIGS. 20 and 21, the secondary gate 504 is preferably a generally U-shaped wire structure that is adapted to wrap around an outer perimeter of spine 523.

In the illustrated embodiment, the primary gate 508 and the secondary gate 504 are both biased toward closed position 510 illustrated in FIG. 21. The secondary gate 504 preferably rotates in the same plane as the primary gate 508. Locking mechanism 512 retains the primary gate 508 in the closed position 510. Any of the locking mechanisms disclosed herein can be used with the embodiment of FIGS. 19-21.

In use, the secondary gate 504 is rotated in direction 514 in opposition to the biasing force until it contacts the primary gate 508, as illustrated in FIG. 19. By simultaneously pressing both gates 504, 508 toward the open position 518 as illustrated in FIG. 19, access is provide to the entire interior region 516. Free end 505 is displaced away from the carabiner 500. A belay loop or other item (not shown) can then be engaged with first portion 526 of the interior region 516.

The user then has the option of releasing only the secondary gate 504 so that biasing force rotates it in direction 520 to the closed position 510 until it contacts stop 522 located on a side edge of the spine 523, as illustrated in FIG. 20. The belay loop is retained in the first portion 526 by the primary gate 508. Alternatively, the user can release both gate 504, 508 so that the biasing forces advance the gates 504, 508 to the closed position 510 illustrated in FIG. 21. The secondary gate 504 extends across the interior region 516.

In the closed position 510 illustrated in FIG. 21, the interior region 516 is divided into a first portion 526 and a second portion 528. Even in the closed position 510, the user can access the second portion 528 by advancing the primary gate 508 to the open position 518 illustrated in FIG. 20. The biasing force urges the secondary gate 504 to slide along the stop 522. The secondary gate 504 can be displaced in the plane to extend across the interior region 516 as the primary gate 508 rotates between the open position 518 and the closed position 510.

Figure 22:
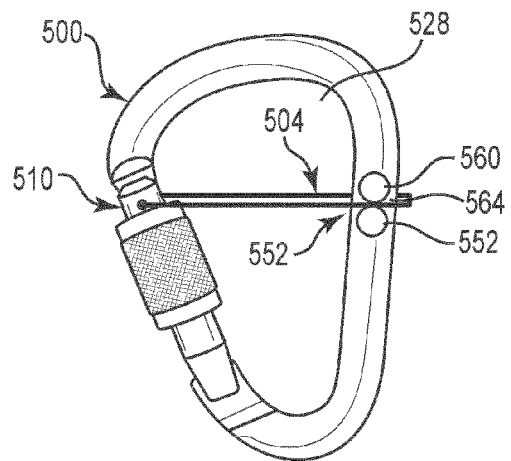
FIG. 22 illustrates a variation of the carabiner illustrated in FIG. 19 with a retaining structure for the secondary gate in accordance with an embodiment of the present invention.

FIG. 22 illustrates a variation of the carabiner 500 illustrate in FIGS. 19-21. The carabiner 550 includes an engagement structure 552 on the spine 523 adapted to engage the secondary gate 504 in the closed position 510. In the illustrated embodiment, the engagement structure 552 is a pair of stops 560, 522 with a recess or detent region 564 there between. The wire gate structure of the secondary gate 504 preferably has sufficient resilience to advance past stop 560, but not stop 562. The engagement structure 552 permits the secondary gate 504 to remain in the closed position 510, while still sliding along the stop 522 as the primary gate 508 is advance to the open position 518, thereby permitting access to the second portion 528 (see e.g., FIGS. 20 and 24).

Figure 23:
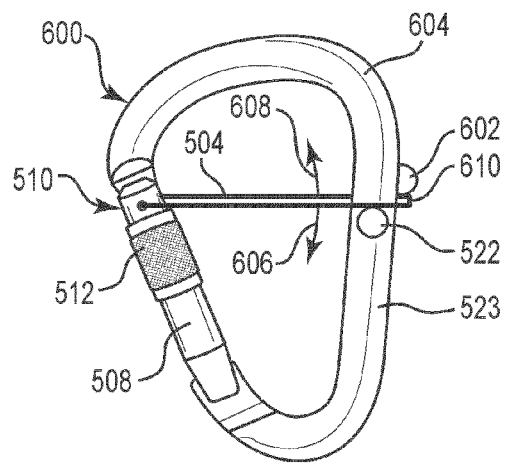
FIGS. 23 and 24 illustrate a variation of the carabiner illustrated in FIG. 19 with an alternate retaining structure for the secondary gate in accordance with an embodiment of the present invention.
Figure 24:
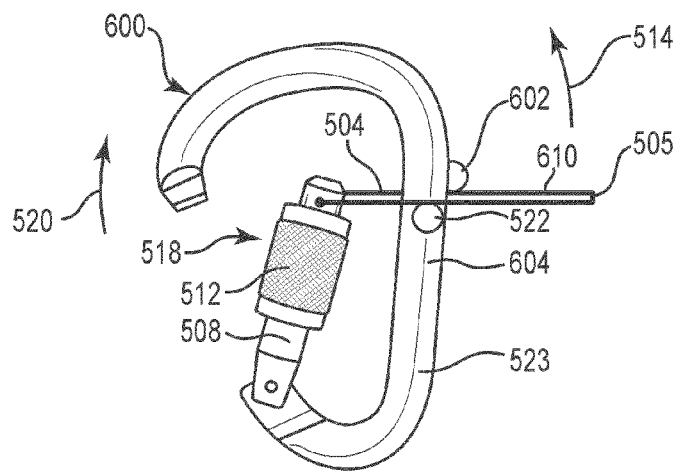

FIGS. 23 and 24 illustrate another variation of the carabiner illustrated in FIGS. 19-21. Carabiner 600 includes a second stop 602 on the back edge 604 of the spine 523. In the preferred embodiment, the secondary gate 504 is positively locked in the closed position 510 when the locking mechanism 512 is locked. In particular, the stop 522 inhibits movement of the secondary gate 504 in direction 606 and the second stop 602 inhibits movement in direction 608. The stop 602 does not interfere with sliding of the secondary gate 504 along the stop 522 in response to movement of the primary gate 508 toward the open position 518, as illustrated in FIG. 24. In one embodiment, leading edge 612 of the locking mechanism 512 biases the secondary gate 504 into engagement with the stop 602 when in the fully locked position 510.

In order to move the secondary gate 504 to the open configuration 518 (see e.g., FIG. 19), the primary gate 508 must first be advance toward the open position 518 so that portion 610 of distal end 505 of the secondary gate 504 can extend beyond the second stop 602. The secondary gate 504 can then rotate in the direction 514.

Once in the open position 518 illustrated in FIG. 19, the user releases both gates 504, 508. The biasing force on the secondary gate 504 is preferably sufficient to advance the secondary gate 504 in the direction 520, so that portion 610 automatically moves past the second stop 602, either by elastic deformation of the secondary gate 504 or by overcoming the biasing force retaining the primary gate 508 in the closed position 510. Once the secondary gate 504 is engaged with the stop 522 as illustrated in FIG. 24, the primary gate 508 is released. The biasing force moves the primary gate 508 to the closed position 510 and the portion 610 of the secondary gate 504 is locked in the closed position 510 between the stops 522, 602. No action is required by the user other than to lock the locking mechanism 512.

Figure 25:
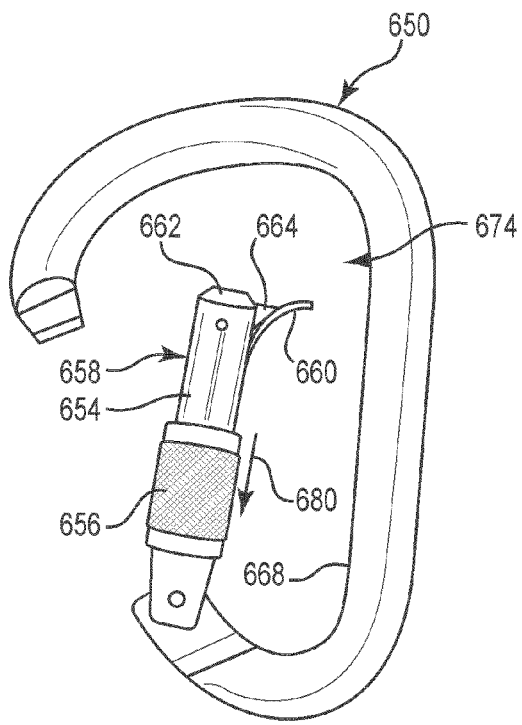
FIGS. 25 through 28 illustrate a carabiner with a sliding anti-cross loading feature in accordance with an embodiment of the present invention.

FIGS. 25 through 28 illustrate an alternate embodiment of a carabiner 650 with a sliding secondary gate 652 in accordance with an embodiment of the present invention. The secondary gate 652 slides in a groove (not shown) in the primary gate 654. In the preferred embodiment, the secondary gate 652 is coupled to locking mechanism 656. With the locking mechanism 656 in the fully opened position 658 as illustrated in FIG. 25, the secondary gate 652 is displaced into substantial alignment with the primary gate 654, with only distal portion 660 exposed. Alternatively, the secondary gate 652 can be displaced so as to be substantially contained within the primary gate 654.

Figure 26:
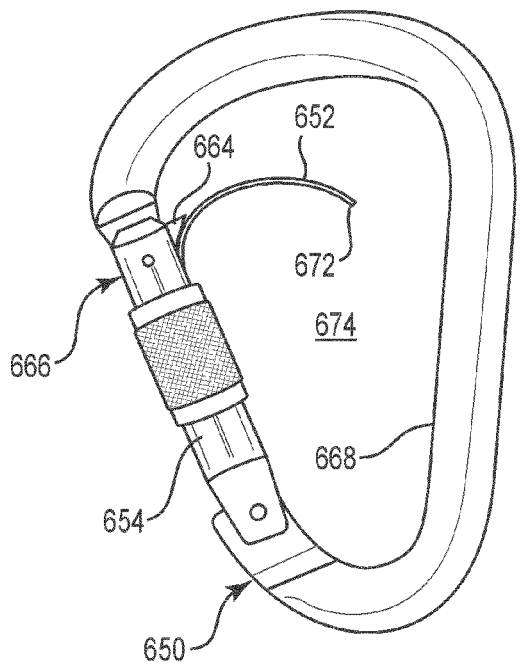

With the primary gate in the closed position 666, the locking mechanism 656 is advanced toward distal end 662 of the primary gate 654. The secondary gate 652 advances beyond of the primary gate 654 as illustrated in FIG. 26. Feature 664 on the primary gate 654 near the distal end 662 directs the secondary gate 652 toward the spine 668 of the carabiner 650. In the illustrated embodiment, the feature 664 is a generally triangular ramp, although a variety of other structures may be used.

Figure 27:
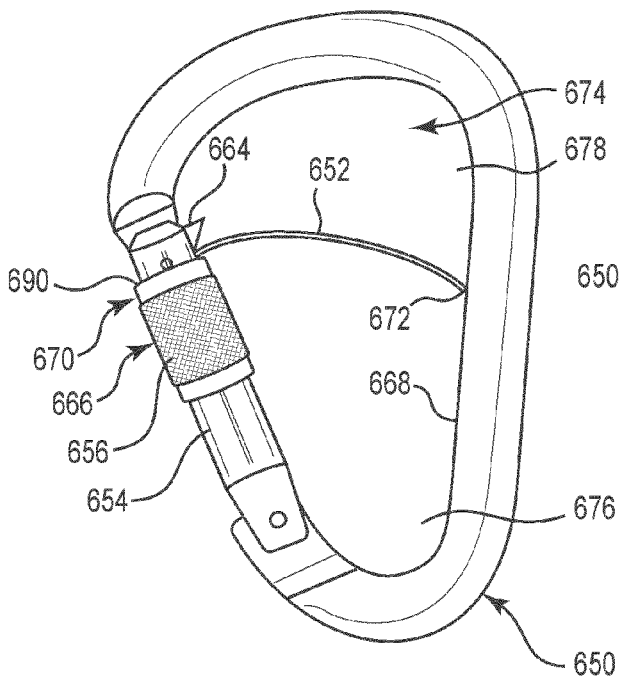

When the locking mechanism 656 is in the fully locked position 670 illustrated in FIG. 27, distal end 672 of the secondary gate 652 engages the spine 668, dividing the interior region 674 into a first portion 676 and a second portion 678. Leading edge 690 of the locking mechanism 656 preferably compresses the secondary gate 652 against the feature 664.

Figure 28:
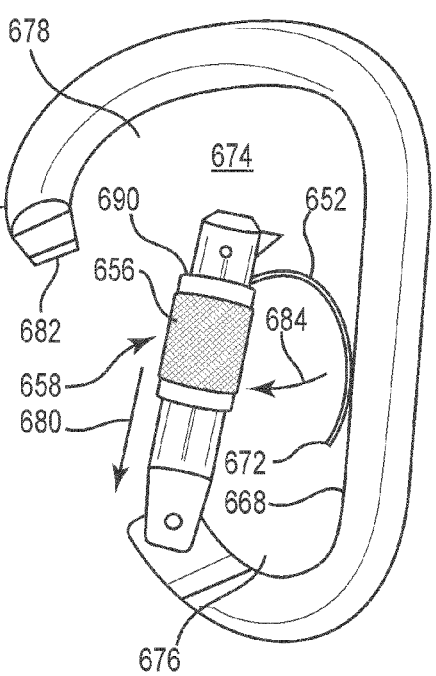

In use, the locking mechanism 656 can be displaced in direction 680 a sufficient amount to disengaged from the first end 682 of the carabiner 650, as illustrated in FIG. 28. The primary gate 654 is now free to rotate to the open position 658, while the secondary gate 652 is still substantially extended. As a result, the secondary gate 652 extends across the interior region 674. Rotation of the primary gate 654 may require flexing the secondary gate 652, as illustrated in FIG. 28. The secondary gate 652 is flexed between the spine 668 and the leading edge 690 of the locking mechanism 656.

The first portion 676 can now be accessed by flexing the secondary gate 652 further in direction 684 or by sliding the locking mechanism 654 in the direction 680 to retract the secondary gate 652 until the distal end 672 is disengaged from the spine 668. The secondary gate 652 also supplements the biasing force urging the primary gate 654 toward the closed position Where a range of values is provided, it is understood that each intervening value, to the tenth of the unit of the lower limit unless the context clearly dictates otherwise, between the upper and lower limit of that range and any other stated or intervening value in that stated range is encompassed within the inventions. The upper and lower limits of these smaller ranges which may independently be included in the smaller ranges is also encompassed within the inventions, subject to any specifically excluded limit in the stated range. Where the stated range includes one or both of the limits, ranges excluding either both of those included limits are also included in the inventions.

Unless defined otherwise, all technical and scientific terms used herein have the same meaning as commonly understood by one of ordinary skill in the art to which these inventions belong. Although any methods and materials similar or equivalent to those described herein can also be used in the practice or testing of the present inventions, the preferred methods and materials are now described. All patents and publications mentioned herein, including those cited in the Background of the application, are hereby incorporated by reference to disclose and described the methods and/or materials in connection with which the publications are cited.

The publications discussed herein are provided solely for their disclosure prior to the filing date of the present application. Nothing herein is to be construed as an admission that the present inventions are not entitled to antedate such publication by virtue of prior invention. Further, the dates of publication provided may be different from the actual publication dates which may need to be independently confirmed.

Other embodiments of the invention are possible. Although the description above contains much specificity, these should not be construed as limiting the scope of the invention, but as merely providing illustrations of some of the presently preferred embodiments of this invention. It is also contemplated that various combinations or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims.

What is claimed is:

1. A carabiner comprising:
a generally C-shaped body comprising a first end and a second end located on opposite sides of an opening;
a primary gate mounted to the second end and rotatable about a first axis perpendicular to a plane that bisects the C-shaped body, the primary gate rotatable between a closed position with the primary gate engaged with the first end and the C-shaped body enclosing an interior region, and an open position with the primary gate located generally in the interior region; and
a secondary gate comprising a first end attached to the primary gate and a second free end having a portion adapted to engage an interior surface of the C-shaped body, the portion of the second free end constrained to move only in the interior region, the secondary gate adapted to be displaced in the plane relative to the primary gate between a closed configuration that divides the interior region into a first portion and a second portion, and an open configuration where the interior region is accessible through the opening, wherein the secondary gate is adapted to move between the open configuration and the closed configuration as the primary gate moves between the open position and the closed position.

2. The carabiner of claim 1 wherein the secondary gate is pivotally attached to the primary gate.

3. The carabiner of claim 2 wherein the portion of the secondary gate is biased to slide along the interior surface of the C-shaped body as the primary gate rotates between the closed position and the open position.

4. The carabiner of claim 2 wherein the secondary gate is biased toward the open configuration, the carabiner comprising a locking mechanism on the primary gate that simultaneously advances the secondary gate toward the closed configuration as the locking mechanism is advanced toward a locked position.

5. The carabiner of claim 1 wherein the secondary gate is adapted to move in the plane to extend across the interior region as the primary gate rotates between the open position and the closed position.

6. The carabiner of claim 1 wherein engagement of the second free end of the secondary gate with the interior surface of the C-shape body is sufficient to prevent the carabiner from rotating in a belay loop.

7. The carabiner of claim 1 wherein engagement of the second free end of the secondary gate with the interior surface of the C-shape body is sufficient to prevent a rope from moving from the first portion to the second portion.

8. The carabiner of claim 1 comprising a locking mechanism that engages with the primary gate and retains the secondary gate in the closed configuration.

9. The carabiner of claim 1, wherein the second distal end of the secondary gate rotates is toward the second end of the C-shaped body as the primary gate rotates toward the open position.

10. The carabiner of claim 1 wherein engagement of the second free end of the secondary gate with the interior surface of the C-shape body is sufficient to prevent cross-loading of the carabiner during use.

11. The carabiner of claim 1 wherein the secondary gate is attached proximate a distal end of the primary gate.

12. A carabiner comprising:
a generally C-shaped body comprising a first end and a second end at opposite sides of an opening;
a primary gate mounted to the second end and rotatable about a first axis perpendicular to a plane that bisects the C-shaped body, the primary gate rotatable between a closed position with the primary gate engaged with the first end and the C-shaped body enclosing an interior region, and an open position with the primary gate located generally in the interior region; and
a secondary gate comprising a first end attached to the primary gate and a second free end of the secondary gate constrained to move only in the interior region, the secondary gate adapted to be displaced in the plane relative to the primary gate between a closed configuration that divides the interior region into a first portion and a second portion, and an open configuration where the interior region is accessible through the opening, wherein the secondary gate is adapted to move in the plane to extend across the interior region as the primary gate rotates between the open position and the closed position.

13. The carabiner of claim 12 wherein the secondary gate is adapted to move between the open and closed configurations as the primary gate moves between the open and closed positions.

14. The carabiner of claim 12 wherein the secondary gate is adapted to prevent the carabiner from rotating in a belay loop.

15. The carabiner of claim 12 wherein the secondary gate is adapted to prevent cross-loading of the carabiner.

16. The carabiner of claim 12 wherein the secondary gate is pivotally attached to the primary gate.

17. The carabiner of claim 12 wherein the secondary gate is adapted to prevent a rope from moving from the first portion to the second portion.

18. A method of making a carabiner comprising the steps of:
mounting a primary gate to a second end of a generally C-shaped body for rotation about a first axis perpendicular to a plane that bisects the C-shaped body, the primary gate rotatable between a closed position with the primary gate engaged with a first end of the C-shaped body and an open position with the primary gate located in an interior region of the C-shaped body;
attaching a first end of a secondary gate to the primary gate so that a second free end of the secondary gate is constrained to move only in the interior region in the plane of the primary gate; and
rotating the primary gate between the closed position and the open position to rotate the secondary gate in the plane between a closed configuration where the secondary gate extends across the interior region to divide the interior region into a first portion and a second portion, and an open configuration where the interior region is accessible through the opening.

* * * * *